US012411971B2

(12) United States Patent
Kwong et al.

(10) Patent No.: US 12,411,971 B2
(45) **Date of Patent: *Sep. 9, 2025**

(54) AUTHENTICATING ACCESSES TO A SHARED DATASTORE OF A MULTI-TENANT COMPUTER SYSTEM

(71) Applicant: Salesforce, Inc., San Francisco, CA (US)

(72) Inventors: Helen Kwong, Danville, CA (US); Benjamin Busjaeger, San Carlos, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,407

(22) Filed: Oct. 6, 2023

(65) Prior Publication Data

US 2024/0037267 A1 Feb. 1, 2024

Related U.S. Application Data

(63) Continuation of application No. 17/338,437, filed on Jun. 3, 2021, now Pat. No. 11,783,071.

(51) Int. Cl.

| | |
|---|---|
| ***G06F 21/62*** | (2013.01) |
| ***G06F 21/60*** | (2013.01) |
| ***H04L 9/40*** | (2022.01) |

(52) U.S. Cl.

CPC ........ *G06F 21/6218* (2013.01); *G06F 21/602* (2013.01); *G06F 21/604* (2013.01); *H04L 63/104* (2013.01)

(58) Field of Classification Search

None

See application file for complete search history.

(56) References Cited

U.S. PATENT DOCUMENTS

| | | | |
|---|---|---|---|
| 9,003,502 | B2 | 4/2015 | Zhang et al. |
| 9,043,458 | B2 | 5/2015 | Balaji et al. |
| 9,361,468 | B2 | 6/2016 | Peddada |
| 10,313,261 | B1 | 6/2019 | Walton, III |
| 10,484,382 | B2 | 11/2019 | Wilson et al. |
| 10,846,390 | B2 | 11/2020 | Subramanian et al. |

(Continued)

OTHER PUBLICATIONS

A Authentication and Access Authorization Mechanism on the PaaS Platform. Xu. IEEE. (Year: 2019).*

(Continued)

*Primary Examiner* — Venkat Perungavoor

(74) *Attorney, Agent, or Firm* — Kowert, Hood, Munyon, Rankin & Goetzel, P.C.; Mark D. Seegers; Dean M. Munyon

(57) ABSTRACT

A multi-tenant computer system authenticates access to a shared datastore by a shared service running on the multi-tenant computer system. The shared service is operable to access the shared datastore to execute requests from a plurality of multi-tenant cloud computing services. The requests include an indication of a particular tenant and a particular tenant grouping indicator. Requests are authenticated by cryptographically verifying the request and verifying that the particular tenant is associated with the particular tenant grouping indicator. In response to authenticating a request, the shared service accesses the shared datastore to execute the first request.

17 Claims, 8 Drawing Sheets

(56) References Cited

U.S. PATENT DOCUMENTS

| | | | | |
|---|---|---|---|---|
| 11,323,454 | B1* | 5/2022 | Li | H04L 63/0421 |
| 2012/0096525 | A1* | 4/2012 | Bolgert | G06F 11/3006 726/6 |
| 2013/0031136 | A1 | 1/2013 | Shah | |
| 2013/0066940 | A1 | 3/2013 | Shao | |
| 2015/0007273 | A1 | 1/2015 | Lin | |
| 2015/0172222 | A1 | 6/2015 | Liao | |
| 2017/0063836 | A1* | 3/2017 | Cui | H04L 63/0884 |
| 2019/0109852 | A1 | 4/2019 | Ranganathan et al. | |
| 2021/0099301 | A1 | 4/2021 | Busjaeger et al. | |
| 2021/0119992 | A1* | 4/2021 | Johnson | G06F 16/22 |
| 2021/0141930 | A1 | 5/2021 | Aziz et al. | |

OTHER PUBLICATIONS

A Cross Tenant Access Control (CTAC) Model for Cloud Computing: Formal Specification and Verification. Alam. IEEE. (Year: 2017).*

Multi-tenants Data Duplication Secure Storage in SaaS. Li. IEEE. (Year: 2015).*

A Software as a Service with Multi-tenancy Support for an Electronic Contract Management Application. Kwok. IEEE. (Year: 2008).

Multi-tenant attribute-based access control for cloud infrastructure services. Ngo. Elsevier. (Year: 2016).

Resource Accounting of Shared IT Resources in Multi-Tenant Clouds. Tak. IEEE. (Year: 2017).

Secure Information and Resource Sharing in Cloud Infrastructure as a Service. Zhang. ACM. (Year: 2014).

* cited by examiner

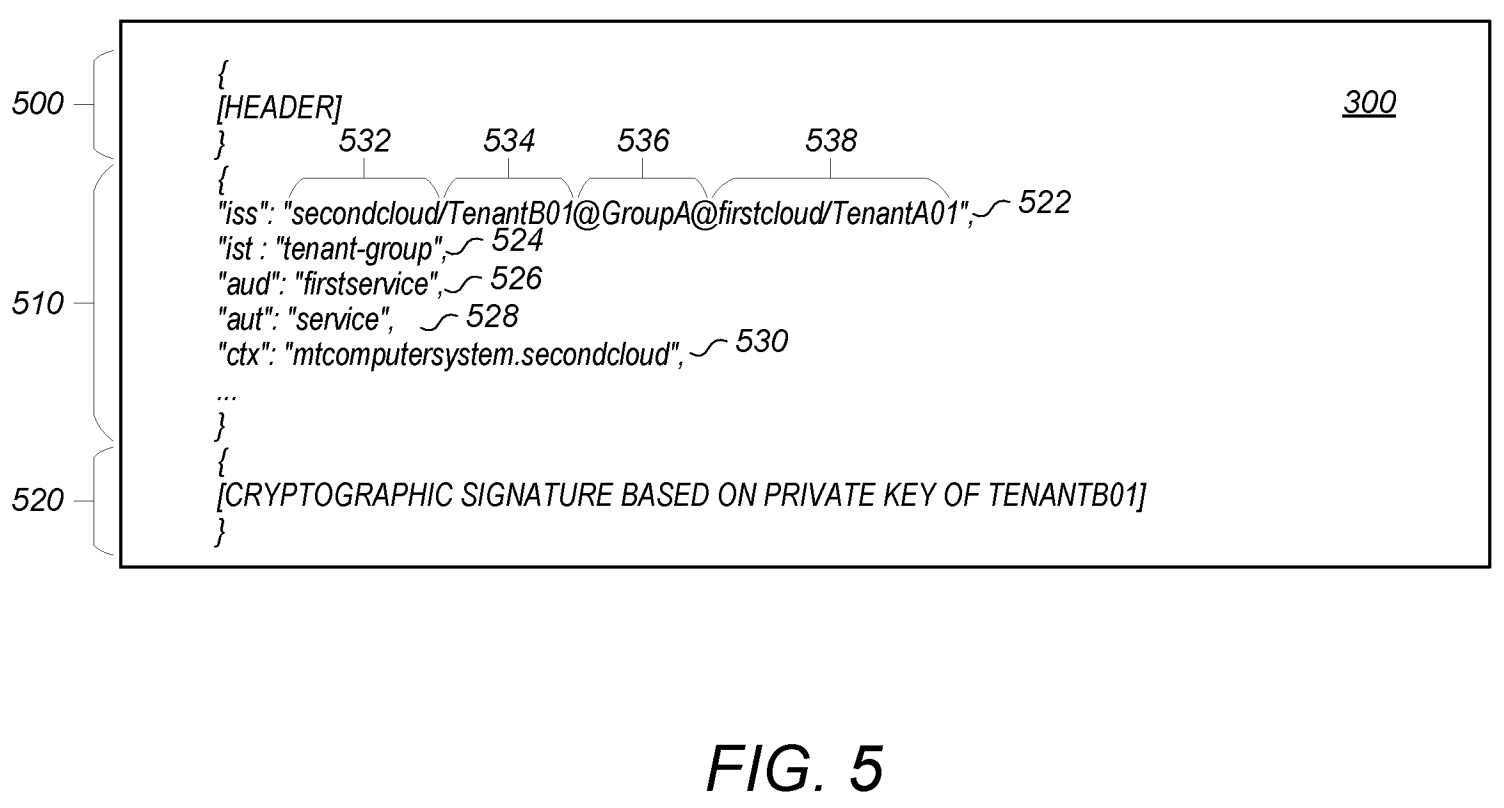

```
{
[HEADER]
}
{
"iss": "secondcloud/TenantB01@GroupA@firstcloud/TenantA01",
"ist : "tenant-group",
"aud": "firstservice",
"aut": "service",
"ctx": "mtcomputersystem.secondcloud",
...
}
{
[CRYPTOGRAPHIC SIGNATURE BASED ON PRIVATE KEY OF TENANTB01]
}
```

FIG. 5

AUTHENTICATING ACCESSES TO A SHARED DATASTORE OF A MULTI-TENANT COMPUTER SYSTEM

PRIORITY CLAIM

The present application is a continuation of U.S. application Ser. No. 17/338,437, entitled "AUTHENTICATING ACCESSES TO A SHARED DATASTORE OF A MULTI-TENANT COMPUTER SYSTEM," filed Jun. 3, 2021, the disclosure of which is incorporated by reference herein in its entirety.

BACKGROUND

Technical Field

This disclosure relates generally to multi-tenant computer systems.

Description of the Related Art

Software-level multi-tenancy enables a single instance of software to run on computer hardware and provide services to a plurality of users. With multi-tenancy, a software application is designed to provide tenants with a share of the instance such that data, metadata, configurations, settings, user management and other functions are isolated from the other tenants. Tenants may store information in a shared datastore of the multi-tenant computer system. Moreover, the tenants of a multi-tenant computer system may themselves provide services to their own tenants. These subtenants may also store information in a shared datastore of the multi-tenant computer system.

BRIEF DESCRIPTION OF THE DRAWINGS

FIG. 5 is an example token sent from a multi-tenant cloud computing service to a shared service in accordance with various embodiments.

Figure 1:
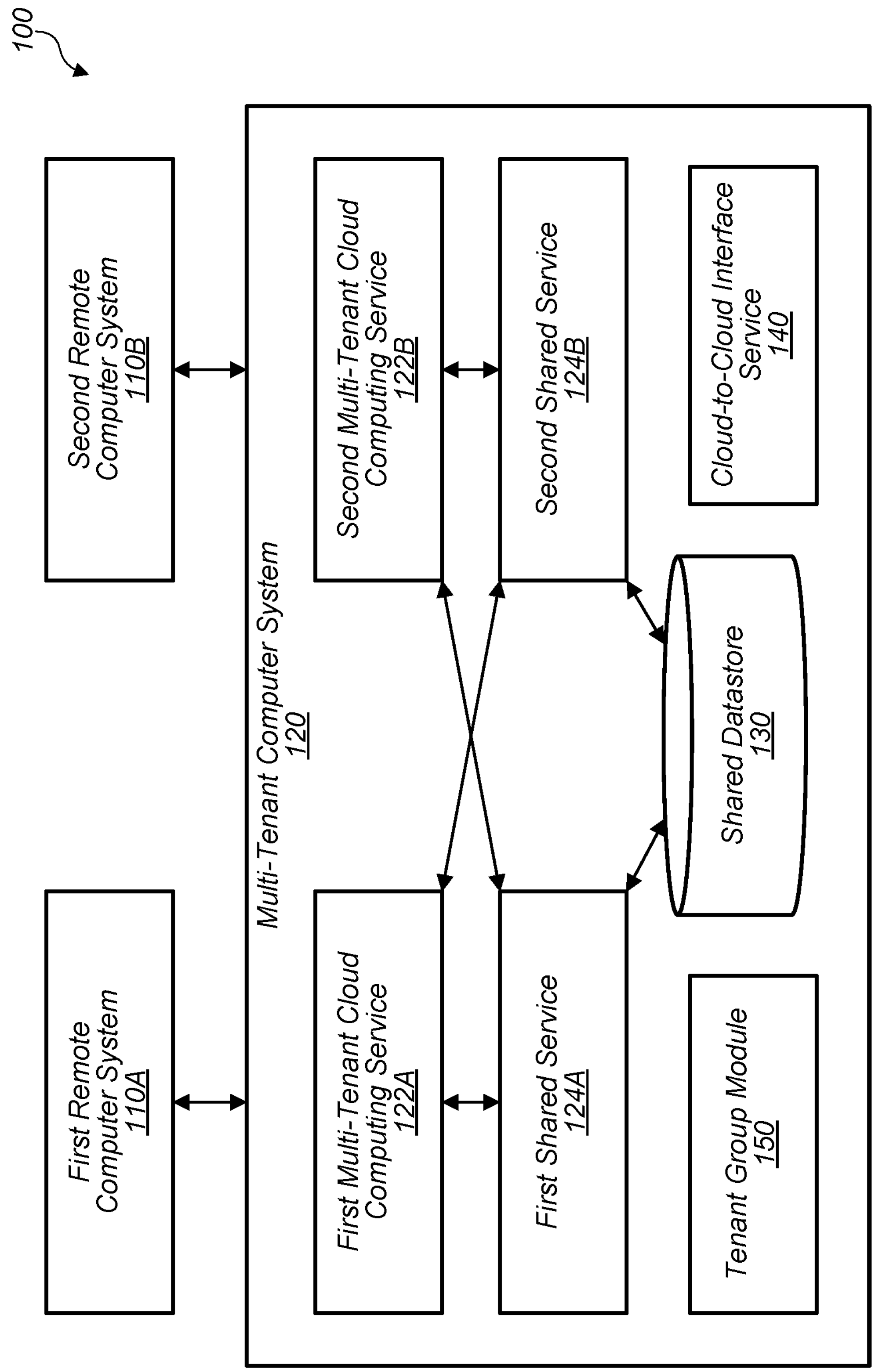
FIG. 1 is a block diagram illustrating an embodiment of a computer system configured to authenticate and execute requests made by multi-tenant cloud computing services to shared services.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to authenticate requests" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" multi-tenant cloud computing services would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

"In this disclosure, various "modules" operable to perform designated functions are shown in the figures and described in detail (e.g., tenant group module 150, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa."

DETAILED DESCRIPTION

Outside of a multi-tenant computer system, some tenants and subtenants may be associated with each other and desire to share access to information stored in a shared datastore of the multi-tenant computer system. For example, if Company ABC is a tenant of two different multi-tenant cloud computing services (also referred to herein as "subtenancy"), Company ABC may desire that both tenants be able to use a shared service to access information stored in the shared datastore. In a multi-tenant computer system that facilitates multiple multi-tenant cloud services that themselves have their own tenants, sharing access to information stored in shared datastores can be complex to implement. In particular, because tenancy can be defined in any of a number of ways and authenticated using any number of techniques, just because the same multi-tenant computer system implements two multi-tenant cloud services does not mean there are no barriers between the two multi-tenant cloud services. Thus, the credentials usable to access a first multi-tenant cloud service may not be useable to access a second multi-tenant cloud service. Further, to maintain information security, access to information in shared datastores is restricted (e.g., only the tenant that stored information may access it, only certain tenants may access the shared datastore).

As a non-limiting example, Company ABC is a shoe company. Company ABC uses a multi-tenant computer system that implements a first multi-tenant cloud computing service that is a customer relationship management service that maintains contacts with buyers of shoes, a second multi-tenant cloud computing service that is a commerce service that allows customers to purchase shoes via Company ABC's website, and a shared inventory service that is usable by the multi-tenant cloud computing services to access and maintain information about the number of shoes in inventory. Company ABC may desire that its two tenants have access to the number of shoes in inventory. For example, Company ABC may want the customer relationship management service to have access to the number of shoes in stock to drive interactions with buyers at shoe stores and the commerce service to have access to the same information to allow customers to make direct purchases on Company ABC's website. To do so, Company ABC would need for both multi-tenant cloud computing services to be able to use the inventory service to access the information in the shared datastore. In order to maintain information security, the multi-tenant computer system ensures that both tenants are authorized to access the inventory information by determining whether there is a trust relationship between the tenant that owns the information and other Company ABC tenants.

Establishing trust relationships one-at-a-time (e.g., Tenant One extends trust to Tenant Two) can result in a cumbersome network of trust relations that consumes computational resources to manage and maintain. This one-at-a-time approach of "extending trust" may become unwieldy at least because as the number of subtenants, multi-tenant cloud computing services, and shared services increases that size of the network of extended trust relationships increases. Additionally, if an entity discontinues use of the first multi-tenant cloud computing service, this extended trust may have to be reworked such that Tenant Two becomes the owner of the shared information or the discontinued account for subtenant one merely for the purposes of maintaining the extended trust relationship.

Rather than establishing trust relationships one-at-a-time from one tenant to another tenant, the techniques proposed herein use "tenant groups" to establish trust relationships. Instead of determining, for example, whether the tenant that owns information stored in the shared datastore has extended trust to another tenant, access to that information may be granted to a particular tenant group. Membership in the tenant group may be used to determine whether a tenant is authorized to access information. In order to facilitate the use of tenant groups to authenticate information accesses, the inventors here have developed the following techniques of creating tenant groups and adding tenants to the tenant groups, invoking tenant group membership in requests to access the information stored in the shared datastore, and authenticating access requests by (a) using cryptographic techniques to verify the authenticity of requests and (b) determining whether the tenant making the request is a member of the tenant group.

FIG. 1 is a block diagram illustrating an embodiment of a computer system 100 including a multi-tenant computer system 120 configured to authenticate and execute requests made by multi-tenant cloud computing services 122 to shared services 124 using tenant groupings.

As shown in FIG. 1, multi-tenant computer system 120 communicates with one or more remote computer systems 110 (e.g., first remote computer system 110A, second remote computer system 110). In various embodiments, such communication includes communication over one or more local area networks and/or wide area networks (e.g., the Internet). In various embodiments, remote computer systems 110 are used by users to access multi-tenant computer system 120 and send requests to components thereof. In various instances, such requests include requests made to multi-tenant cloud computing services 122 that result in requests being sent to shared services 124 for execution as discussed herein. While two remote computer systems 110 are shown in FIG. 1 (i.e., first remote computer system 110A and second remote computer system 110B), it will be understood that any number of remote computer systems 110 may be present (e.g., tens, hundreds, thousands, or millions of remote computer systems 110). In various embodiments, individual remote computer systems 110 are implemented by software running on a computer system (e.g., a desktop computer, a laptop computer, a tablet computer, a mobile phone, a server, a wearable computer) or a plurality of computer systems (e.g., a network of servers operating as a cloud). In other embodiments, individual remote computer systems 110 are implemented in specialized hardware (e.g., on an FPGA) or in a combination of hardware and software.

In various embodiments, multi-tenant computer system 120 is implemented by software running on a computer system (e.g., a desktop computer, a laptop computer, a tablet computer, a mobile phone, a server) or a plurality of computer systems (e.g., a network of servers operating as a cloud). In other embodiments, multi-tenant computer system 120 is implemented in specialized hardware (e.g., on an FPGA) or in a combination of hardware and software. In various embodiments, multi-tenant computer system 120 implements one or more multi-tenant cloud computing services 122, one or more shared services 124, one or more shared datastores 130 as well as a cloud-to-cloud interface service 140 and a tenant group module 150. In the embodiment shown in FIG. 1, multi-tenant computer system 120 implements a first multi-tenant cloud computing service 122A, a second multi-tenant cloud computing service 122B, a first shared service 124A, a second shared service 124B, and a single shared datastore 130, but in other embodiments, multi-tenant computer system 120 implements any number of these components. Additionally, tenant group module 150 and cloud-to-cloud interface service 140 may be implemented separately as shown in FIG. 1 or in a single module. Moreover, the operations performed by the various components of multi-tenant computer system 120 may be distributed across multiple instances of the components (e.g., multiple instances of first shared service 124A that share the load).

In various embodiments, multi-tenant cloud computing services 122 (including first multi-tenant cloud computing service 122A and a second multi-tenant cloud computing service 122B) are tenants of multi-tenant computer system 120 and are instances of software that can be accessed by multiple subtenants according to a multi-tenancy model and provide functions to their subtenants. As used herein, "multi-tenant cloud computing services" refers to software that is accessible to its tenants and is useable to perform functions for such tenants (this is distinct from a cloud environment like AMAZON WEB SERVICES that provides distributed hardware and software on which the cloud environment's users can run software). As discussed in further detail in reference to FIG. 2, different multi-tenant cloud computing services 122 may have different sets of tenants and define tenancy differently. Thus, the respective multi-tenant cloud computing services 122 have their own respective sets of tenants (also referred to herein as "subtenants") while the various multi-tenant cloud computing services 122 are themselves tenants of multi-tenant computer system 120. In various embodiments, first multi-tenant cloud computing service 122A performs different functions for its subtenants than second multi-tenant cloud computing service 122B performs for its subtenants (e.g., first multi-tenant cloud computing service 122A may perform various tasks relating to customer relationship management such as storing contact information of customers while second multi-tenant cloud computing service 122B may perform various tasks relating to fulfilling orders from customers).

As discussed below, the multi-tenant cloud computing services 122 are operable to send requests, on behalf of their subtenants, to one or more shared services 124, the execution of which include accessing shared datastore 130. Shared services 124 (including first shared service 124A and a second shared service 124B) are services running on multi-tenant computer system 120 that are operable to access shared datastore 130 to execute requests sent from the various multi-tenant cloud computing services 122. As used herein, a "shared service" is software that is operable to access, change, and/or manage data in shared datastore 130 on behalf of multi-tenant cloud computing services 122 and/or tenants of multi-tenant cloud computing services 122. In contrast to multi-tenant cloud computing services 122, in various embodiments shared services 124 do not have their own tenants but instead execute tasks sent by multi-tenant cloud computing services 122 on behalf of substants of the multi-tenant cloud computing services 122. In such embodiments, while shared services 124 may keep track of which tenants (or tenant groups) of multi-tenant cloud computing services 122 use the shared services 124 and which tenants have been provisioned to use shared datastore 130, such tenants nevertheless belong to multi-tenant cloud computing services 122. In other embodiments, however, shared services 124 may have their own tenants. As defined herein, a shared service 124 that has its own tenants but is operable to access, change, and/or manage data on behalf of multi-tenant cloud computing services 122 is still referred to herein as a "shared service" and is not a "multi-tenant cloud computing service" as defined herein.

In various embodiments, first shared service 124A is operable to perform different functions for multi-tenant cloud computing services 122 than second shared service 124B (e.g., first shared service 124A is operable to access and manage information stored in shared datastore 130 relating to inventories of goods and second shared service 124 is operable to access and manage information stored in shared datastore 130 relating to order fulfilment). In various embodiments, one or more of the shared services 124 are also operable to execute requests sent by tenants of multi-tenant computer system 120 that are not themselves multi-tenant cloud computing services 122. For example, such a tenant may be a user account directly registered with multi-tenant computer system 120 (i.e., a user account that is not a subtenant of a multi-tenant cloud computing services 122). Such a user account is referred to herein as a "direct tenant" of multi-tenant computer system 120. Additionally, as discussed above, in various instances, a shared service 124 may have its own tenants. Thus, a given shared service 124 may be operable to access, change, and/or manage data in shared datastore 130 on behalf of multi-tenant cloud computing services 122, direct tenants of multi-tenant computer system 120, and/or tenants of the given shared service 124 in various embodiments.

As discussed herein, while the various multi-tenant cloud computing services 122 may have respective sets of tenants with tenancy defined in different ways, in various instances tenants for one multi-tenant cloud computing service 122 (e.g., first multi-tenant cloud computing service 122A) correspond with the same real-world entities as tenants for another multi-tenant cloud computing service 122 (e.g., second multi-tenant cloud computing service 122B). For example, Company ABC may have three tenants of first multi-tenant cloud computing service 122A and four tenants of second multi-tenant cloud computing service 122B. As discussed below, in various embodiments, some or all of these seven tenants corresponding to Company ABC may be associated together in a tenant group (e.g., in Tenant Group A 200 shown on FIG. 2). The multi-tenant cloud computing services 122, shared services 124, and shared datastore 130 are discussed in further detail herein in references to FIG. 2

In various embodiments, multi-tenant computer system 120 implements a tenant group module 150 that is operable to store information (a) relating to the various tenant groups including but not limited to unique identifiers for the various tenant groups and (b) relating to which tenants of multi-tenant computer system 120 and/or subtenants of the various multi-tenant cloud computing services 122 are associated with a particular tenant group. As discussed herein, in various embodiments, the members of a tenant group are associated with a common entity (e.g., a particular person or organization). While the phrase "tenant group" is used herein, it will be understood that in various embodiments, a "tenant group" may include direct tenants of multi-tenant computer system 120 and/or subtenants.

As discussed in further detail in reference to FIGS. 2-6, the membership of a particular tenant group defines a trust relationship such that, with regard to the information stored in shared datastore 130 that is accessed by one or more shared services 124, the level of access that a particular tenant of the tenant group is equal to the level of access of other tenants in the tenant group. For example, shared datastore 130 may store values that are indicative of the amount of a particular good that is stored in a warehouse (e.g., a particular size of a particular type of shoe). As discussed herein, however, a particular shared service 124 may access and/or revise these values as part of executing a request from different multi-tenant cloud computing services 122. In some embodiments, for example, first shared service 124 may access and/or revise these values to reflect incoming shipments from a supplier (as part of executing a request from first multi-tenant cloud computing service 122A) or outgoing shipments from the warehouse to a distribution center (as part of executing a request from second multi-tenant cloud computing service 122B). Thus, different tenants of different multi-tenant cloud computing service 122 are able to make requests that involve accessing these values in the shared datastore 130 (e.g., to read, write, or both) via a particular shared service 124.

In some embodiments, information in shared datastore 130 is stored such that information stored using a first shared service 124A can be made accessible to tenants of the various multi-tenant cloud computing services 122 only via first shared service 124A, but such information is not accessible to second shared service 124B (even if a tenant using second shared service 124 might have access to the information via first shared service 124A). In various embodiments, for example, first shared service 124A and second shared service 124B may have incompatible data models (e.g., first shared service 124A is an inventory service and second shared service 124B is a customer data service that manages personal information for customers such as the customers' ages and contact information). In other embodiments, however, information may be shared across different shared services 124. For example, in an embodiment in which first shared service 124A is an inventory service that maintains inventory values, second shared service 124B may be an electronic shopping chart service that is operable to access and/or revise these values. The electronic shopping cart service may be operable to determine whether the particular good is available for purchase (as part of executing a request from first multi-tenant cloud computing service 122A) and place holds on inventory during customer checkout and remove holds after checkout (as part of executing a request from second multi-tenant cloud computing service 122B).

In order to maintain informational security, multi-tenant computer system 120 is operable to authenticate requests to shared services 124 (e.g., first shared service 124A, second shared service 124B). In various embodiments, such requests include (a) an indication of the tenant that is making the request (e.g., a particular tenant of first multi-tenant cloud computing service 122A) and (b) a tenant grouping indicator. As discussed in further detail in reference to FIGS. 2 and 3, a tenant grouping indicator may be any suitable identifier of a tenant group including a universally unique identifier, a name of the tenant group, etc. In various embodiments, multi-tenant computer system 120 determines that a particular request made to shared service 124 is authentic by (a) cryptographically verifying the particular request and (b) verifying that the tenant associated with the request is associated with the tenant group indicated in the request. In various embodiments, cloud-to-cloud interface service 140 is used to cryptographically authenticate the request (e.g., by performing one or more cryptographic operations to determine whether the appropriate cryptographic key was used to sign the request). In various embodiments, tenant group module 150 is used to determine whether a particular tenant is in fact a member of the tenant group indicated in the request. In various embodiments, tenant group module 150 includes a lookup table that determines whether a particular tenant group (identified by a tenant group indicator) includes the tenant that made the request.

If the request is authenticated, the shared service 124 is operable to execute the request including accessing shared datastore 130. In various embodiments, shared datastore 130 is also operable to authenticate the request in a similar manner by (a) cryptographically verifying the particular request, and (b) verifying that the tenant associated with the request is associated with the tenant group indicated in the request. In various embodiments, shared datastore 130 is also operable to determine whether the tenant group has access to the requested resource (e.g., a directory in shared datastore 130). While cloud-to-cloud interface service 140 and tenant group module 150 are represented as separate components in FIG. 1, in various embodiments cloud-to-cloud interface service 140 and tenant group module 150 may be implemented separately or in a single component. Cloud-to-cloud interface service 140 and tenant group module 150 are discussed in further detail in reference to FIG. 3.

Accordingly, multi-tenant computer system 120 is operable to facilitate requests made to a particular shared service 124 by tenants of various multi-tenant cloud computing services 122 and facilitate access by the particular shared service 124 to a shared datastore 130 to execute the request. The information stored in shared datastore 130 is secured by authenticating the request (a) cryptographically to ensure that the requestor (e.g., the requesting subtenant of a multi-tenant cloud computing service 122) has presented authentic credentials and (b) by verifying that the requestor is a member of the particular tenant group with access to that information stored in shared datastore 130. Because access to this information is verified by determining whether the requestor is associated with the particular tenant group, determining whether a particular requestor is trusted to access the information is based on association with the particular tenant group itself and not in relationship to other tenants that are associated with the tenant group.

In contrast to determining whether a requestor is authorized using tenant group membership, authorization might be done piecemeal. For example, subtenant one of first multi-tenant cloud computing service 122A may write a value to shared datastore 130 via first shared service 124A and authorize subtenant two of second multi-tenant cloud computing service 122B to access the value in shared datastore 130 via first shared service 124A. This one-at-a-time approach of "extending trust" may become unwieldy, however, because as the number of subtenants, multi-tenant cloud computing services 122, and shared services 124 increases the size of the network of extended trust relationships increases. For example, in an embodiment in which three multi-tenant cloud computing services 122 are present and configured to access shared datastore 130 via three shared services 124, six extended trust relationships are needed to allow access to the same information stored in shared datastore 130 to subtenants of each multi-tenant cloud computing service 122 acting via each shared service. If four multi-tenant cloud computing services 122 and four shared service 124 are present, this number increases to twelve. Further, if a single entity owns more than one subtenant in multi-tenant cloud computing services 122, this number increases further still. Additionally, if an entity discontinues use of first multi-tenant cloud computing service 122A, this extended trust may have to be reworked such that subtenant two becomes the owner of the value or the discontinued account for subtenant one merely for the purposes of maintaining the extended trust relationship.

Through the use of tenant groups, however, multi-tenant computer system 120 is operable to restrict access to information based on membership in a tenant group: access is granted based on membership in the tenant group with nonmembers being denied access. An entity can enroll its various tenants in a particular tenant group, and the particular tenant group can be used as the entity's identity across the various multi-tenant cloud computing services 122 and shared services 124. This approach is able to scale as the number of multi-tenant cloud computing services 122, shared services 124, and tenants/subtenants increases. In contrast to an increasing number of trust relationships extended one-at-a-time, the entity's identity across the multi-tenant computer system 120 is maintained by membership in the entity's tenant group. Further, rather than each shared service 124 separately maintaining lists of trust relationships, the shared services 124 can verify that access to information is authorized by querying tenant group module 150 to determine whether a requesting subtenant is a member of the claimed tenant group. If a subtenant account is removed (e.g., because the entity has discontinued use of first multi-tenant cloud computing service 122A), removing the subtenant account from the tenant group will not require reprovisioning a network of extended trust relationships. If a new multi-tenant cloud computing services 122 is added to multi-tenant computer system 120, subtenants for the new multi-tenant cloud computing services 122 can be added to the tenant groups to grant access to shared datastore 130. If a new shared service 124 is added to is added to multi-tenant computer system 120, the shared service 124 can use the existing tenant groups to verify access requests. If an entity changes (e.g., through a merger, acquisition, reorganization), the entity can revise its identity within multi-tenant computer system 120 by changing the membership of its tenant group or adding/removing tenant groups. Accordingly, through the use of tenant groups, facilitating information security in shared datastore 130 is made easier and in a more scalable fashion than through the use of tenant-to-tenant extended trust relationships.

Figure 2:
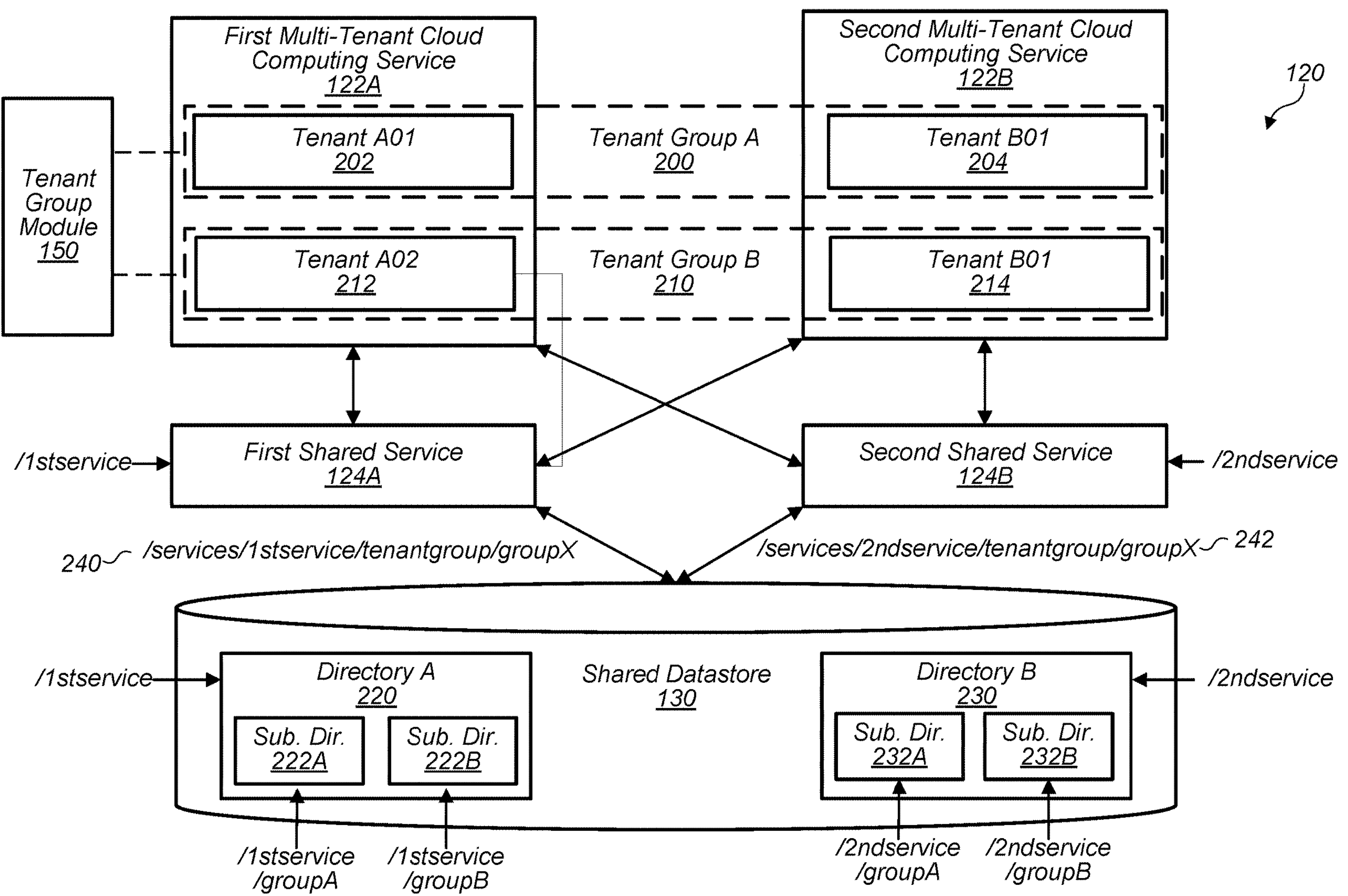
FIG. 2 is an expanded block diagram of the multi-tenant computer system of FIG. 1 in accordance with various embodiments.

FIG. 2 is an expanded block diagram of the multi-tenant computer system 120 in accordance with various embodiments. FIG. 2 depicts first multi-tenant cloud computing service 122A, second multi-tenant cloud computing service 122B, first shared service 124A, second shared service 124B, shared datastore 130, and tenant group module 150 in additional detail. As shown in FIG. 2, tenants of multi-tenant cloud computing services 122A and 122B (which are subtenants of multi-tenant computer system 120 as discussed herein) are grouped together in tenant groups. First multi-tenant cloud computing service 122A and second multi-tenant cloud computing service 122B are operable to send requests to first shared service 124A and second shared service 124B. First shared service 124A and second shared service 124B are operable to access shared datastore 130 to execute such requests and to report results of the execution of the requests to first multi-tenant cloud computing service 122A and second multi-tenant cloud computing service 122B. As shown in FIG. 2 and discussed below, in various embodiments, logical separations are implemented by putting contexts (in the form of URL paths) around both the requests to the shared services 124A and 124B and the execution of the requests to access particular directories or subdirectories in shared datastore 130. Alternatively, rather than dividing information into directories or subdirectories via a file system, information may be stored in shared datastore 130 in the form of a shared table that is accessible by a database service that controls accesses to shared datastore 130 such that information owned by a first tenant group is not accessible to other tenant groups. In such embodiments, the context put around requests may be used to indicate which portions of the shared table (e.g., which row or column) the request is attempting to access.

In the embodiment shown in FIG. 1, first multi-tenant cloud computing service 122A has two tenants: tenant A01 202 and tenant A02 204 and second multi-tenant cloud computing service 122B similarly has two tenants: tenant B01 212 and tenant B02 214. In the embodiment shown in FIG. 1, two tenant groups are depicted: tenant group A 200 and tenant group B 210. Tenant group A 200 includes tenant A01 202 and tenant B01 204. Tenant group B 210 includes tenant A02 212 and tenant B02 214. It will be understood that having four tenants and two tenant groups is merely an example. Any number of tenants or tenant groups may be present in various embodiments.

As discussed above, in various embodiments, tenancy in first multi-tenant cloud computing service 122A and second multi-tenant cloud computing service 122B may be defined differently. As a result, for example, the credentials (e.g., username, password, tokens, etc.) used to authenticate tenants of each may be different. The APIs exposed by first multi-tenant cloud computing service 122A and second multi-tenant cloud computing service 122B to remote computer systems may be different and be called using different parameters. The access URLs of first multi-tenant cloud computing service 122A and second multi-tenant cloud computing service 122B may differ. In short, while an entity may control one or more tenants at both first multi-tenant cloud computing service 122A and second multi-tenant cloud computing service 122B, these tenants are not interoperable between first multi-tenant cloud computing service 122A and second multi-tenant cloud computing service 122B.

Tenant groups like tenant group A 200 and tenant group B may be implemented using lists or tables in which members of the group are recorded and associated with one or more identifiers of the tenant group. As discussed herein, the tenant group can serve as both an alias for members (e.g., a request sent on behalf of tenant A01 202 includes an indicator of tenant group A 200 to execute the request using the credentials for tenant group A 200 and not tenant A01 202 individually) and as a way to establish trust relationships (e.g., when a member is added to the tenant group, the member is granted access to resources to which the tenant group has been granted access). In various embodiments, tenant group module 150 records an indication (e.g., a public key, a unique identifier) corresponding to the various members of each tenant group. When an indication of a tenant group is presented along with an indication of a tenant that is requesting access, tenant group module 150 is operable to be queried as discussed herein to use the tenant group indicator to look up a particular tenant group and determine whether the indication of the tenant is listed as being a member.

In various embodiments, tenant groups have "owning tenants" that that control membership of the tenant group and are authorized to add or remove members. If an owning tenant is a member of the tenant group, it is referred to herein as a "primary member" of the tenant group, but in other embodiments an owning tenant is not a member of the tenant group it owns. In various embodiments, tenant groups only have one owning tenant, but in other embodiments membership in a tenant group can be implemented using tiers such that members on the primary tier can add or remove members while members below the primary tier cannot add or remove members. For example, the primary member of tenant group A is tenant A01 202. As discussed in additional detail in reference to FIGS. 3, 5, and 6, the level of access given to the members of the tenant group is equal to the level access given to the primary member. Thus, if tenant A01 202 has access to a particular directory in shared datastore 130, tenant B01 204 also has access to that particular directory. In embodiments in which the owning tenant is not a member of the tenant group it owns, while the owning tenant can control membership of the tenant group, the owning tenant cannot invoke the tenant group in a request to a shared service 124 to access information in shared datastore 130 as discussed herein.

In various embodiments, tenant group module 150 stores one or more indicators of the various tenant groups (e.g., tenant group A 200, tenant group B 210). In various embodiments, for a given tenant group, tenant group module 150 stores a universally unique identifier (UUID) that has been assigned to the given tenant group when it was created (e.g., when the tenant group was initially provisioned and given at least one member). In various embodiments, the UUID for a tenant group is a label (e.g., a 128-bit or 256-bit code). In some embodiments, the UUID is generated by tenant group module 150, but in other embodiments is generated by clout-to-cloud interface service 140. Additionally or alternatively, in various embodiments, for a given tenant group, tenant group module 150 stores a "natural key" generated from a name of the tenant group (e.g., a name input by a user, a name generated by multi-tenant computer system 120) and a key corresponding to the primary member (or one of the primary members if there is more than one). This key may be, for example, a public key that is assigned to the primary member by cloud-to-cloud interface service 140 or even by the multi-tenant cloud computing service to which the primary member is a tenant. In various embodiments, however, because the primary member of a tenant group may be changed to a different member, while unique like the UUID, the natural key may change. Thus, in various embodiments, a tenant group may be identified by a stable UUID or by a mutable natural key. As used herein, a "tenant grouping indicator" includes but is not limited to a UUID or natural key corresponding to a tenant group.

As discussed herein, first multi-tenant cloud computing service 122A and second multi-tenant cloud computing service 122B are operable to send requests to first shared service 124A, the execution of which include accessing shared datastore 130 and to send requests to second shared service 124B, the execution of which also includes accessing shared datastore 130. In various embodiments, sending such a request includes appending an identifier of the shared service (e.g., /1stservice for first shared service 124A, /2ndservice for second shared service 124B) to a URL to which the address is sent. In so doing, logical separation can be enforced between requests sent to first shared service 124A and second shared service 124B.

Subsequent to receiving a request from first multi-tenant cloud computing service 122A or second multi-tenant cloud computing service 122B, the shared services 124 are operable to authenticate the request in various embodiments. As discussed herein, authenticating the request may include (a) cryptographically verifying the particular request and (b) verifying that the tenant associated with the request is associated with the tenant group indicated in the request. As discussed herein, through the use of tenant groups, different shared services 124 are operable to authenticate requests based on the requesting tenant's membership in a tenant group. Thus, both first shared service 124A and second shared service 124B are operable to use the same information (e.g., an indication of a particular tenant group and a list of members of the particular tenant group) to authenticate requests and without having to maintain separate networks of extended trust relationships. In various embodiments, tenant groupings are the only representation of trust relationships between tenants of the plurality of multi-tenant cloud computing services 122 (e.g., first multi-tenant cloud computing services 122A and second multi-tenant cloud computing services 122B) used by shared services 124 (e.g., first shared service 124A and second shared service 124B) to authenticate requests. Authentication of requests by shared services is discussed in additional detail in reference to FIGS. 3 and 5.

Subsequent to authenticating the requests, shared services 124 are operable to access shared datastore 130 to execute the requests. When the shared services 124 access shared datastore 130, the shared service accesses the shared datastore 130 using a URL that provides the context of the shared service executing the request and the context of the tenant group in the request. For example, when first shared service 124A accesses shared datastore 130, URL suffix 240 is used in various embodiments which indicates that a particular access is done in the context of services generally, first shared service 124A in particular, tenant groups generally, and a particular tenant group (e.g., tenant group A 200) in particular. Similarly, in various embodiments, when second shared service 124B accesses shared datastore 130, URL suffix 242 is used which indicates that a particular access is done in the context of services generally, second shared service 124B in particular, tenant groups generally, and a particular tenant group (e.g., tenant group A 200) in particular.

In various embodiments, shared services 124 are operable to access particular directories and subdirectories of shared datastore 130 as part of executing the requests. In various embodiments, shared datastore 130 includes directories (or portions of a shared table) corresponding to the various shared services 124 in multi-tenant computer system 120 and subdirectors corresponding to various tenant groups. Accordingly, in the example depicted in FIG. 2, shared datastore 130 includes a directory A 220 (corresponding to first shared service 124A and located at /1stservice) and a directory B 230 (corresponding to second shared service 124B and located at /2ndservice). Directory A 220 includes a subdirectory 222A (located at /1stservice/groupA) corresponding to tenant group A 200 and a subdirectory 222B (located at /1stservice/groupB) corresponding to tenant group B 210. Directory B 230 includes a subdirectory 232A (located at /2ndservice/groupA) corresponding to tenant group A 200 and a subdirectory 232B (located at /2ndservice/groupB) corresponding to tenant group B 210. While shared datastore 130 is discussed herein as being implemented using directories containing subdirectors or a shared table divided into rows and columns, it will be understood these are merely examples and that any of a number of techniques to logically separate information in shared datastore 130 may be used. Shared services 124 accesses to shared datastore 130 are discussed in additional detail in reference to FIGS. 3 and 6.

In various embodiments, to maintain informational security, shared services 124 are only operable to access their corresponding directory in shared datastore 130 and shared datastore 130 is operable to only permit shared services 1240 to access their corresponding directories. Thus. first shared service 124A is operable only to access directory A 220 in shared datastore 130 and second shared service 124B is operable only to access directory B 230 in shared datastore 130. Moreover, shared datastore 130 is operable to prevent first shared service 124A from accessing directory B 230 and to prevent second shared service 124B from accessing directory A 220. Similarly, accesses to shared datastore 130 on behalf of particular tenants requesting access in the context of a tenant group is restricted to just the subdirectory corresponding to that tenant group. Thus, tenants A01 202 and B01 204 acting in the context of tenant group A 200, are able to access information in subdirectory 222A via requests to first shared service 124A. Thus, tenant A01 202 may use shared service 124A to update a value stored in subdirectory 222A and tenant B01 212 may use shared service 124A to access that value. However, because subdirectory 222A is logically isolated from other directories, tenants A02 204 and B02 214 are not able to access the value. Similarly, tenants A01 202 and B01 204 acting in the context of tenant group A 200, are able to access information in subdirectory 222B via requests to first shared service 124B. In some embodiments, values in subdirectories in shared datastore 130 corresponding to a particular tenant group corresponding may be synchronized such that a value written in subdirectory 222A may be synchronized with subdirectory 222B such that second shared service 124B is operable to access values written by first shared service. In such embodiments, even if shared datastore 130 is operable to logically separate directories, rows, etc. accessible by various shared services 124 (e.g., a directory accessible via first shared service 124A is not accessible via second shared service 124B), certain information may be accessible to multiple shared service 124 in embodiments in which that certain information is synchronized.

Accordingly, when tenants of multi-tenant cloud computing service 122 are owned by the same entity (e.g., ABC Corp.), and the tenant are members of the same tenant group, information in shared datastore 130 owned by ABC Corp. is able to be accessed by any of the members of the tenant group, acting through the various shared services 124. If a first ABC Corp. tenant updates a value in shared datastore (e.g., the logistics department records a shipment arriving from a supplier being placed in inventory), other ABC Corp. tenants can access this value. For example, a second ABC Corp. tenant that is involved with maintaining the ABC Corp. website can access the updated inventory value and allow customers to purchase the item in question.

Figure 3:
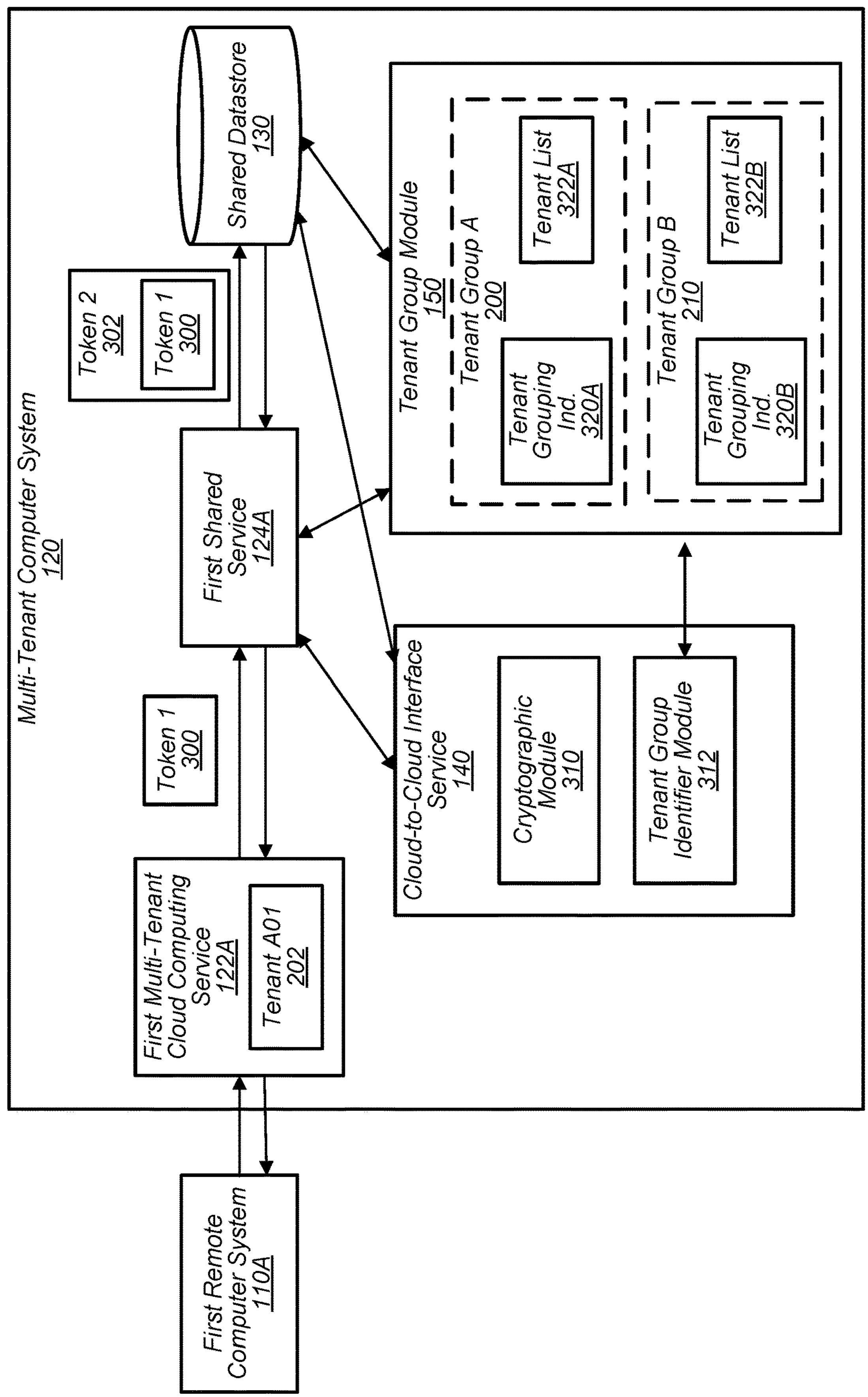
FIG. 3 is a block diagram illustrating authentication and execution of a request made to shared service in accordance with various embodiments.

FIG. 3 is a block diagram illustrating authentication and execution of a request made to shared service 124 in accordance with various embodiments. As depicted in FIG. 3, in various embodiments the authentication and execution of a request may be initiated by a remote computer system 110 (e.g., first remote computer system 110A) communicating with a multi-tenant cloud computing service 122 (e.g., first multi-tenant cloud computing service 122A) of a multi-tenant computer system 120 (e.g., through a website or API provided by first multi-tenant cloud computing service 122A). As discussed herein, a tenant (e.g., tenant A01 202) corresponding to first remote computer system 110A is provisioned at first multi-tenant cloud computing service 122A (which itself is a tenant of multi-tenant computer system 120), and requests to shared services 124 (e.g., first shared service 124A) are made on behalf of this tenant corresponding to first remote computer system 110A.

In response to communication with first remote computer system 110A, first multi-tenant cloud computing service 122A sends a request to the corresponding shared service 124 (e.g., first shared service 124A). In various embodiments, a first token 300 is sent with the request (or the request is included in a body portion of first token 300). In various embodiments, first token 300 includes cryptographic information showing the authenticity of the request (e.g., tenant A01 202 authorized the request) and payload information relating to the invocation of a tenant group (e.g., tenant group A 200) to perform the request. In various embodiments, the first token 300 includes an indication of tenant A01 202 (e.g., a cryptographic indicator of tenant A01 202 such as a public key or other value generated using a private key of tenant A01 202) and an indicator of tenant group A 200 (e.g., a UUID or natural key corresponding to tenant group A 200). In various embodiments, first token 300 is a JavaScript Object Notation (JSON) web token (JWT) as defined in the RFC 7519 proposed standard published by the Internet Engineering Task Force (IETF) dated May 2015. An example first token 300 is shown in FIG. 5.

Figure 6:
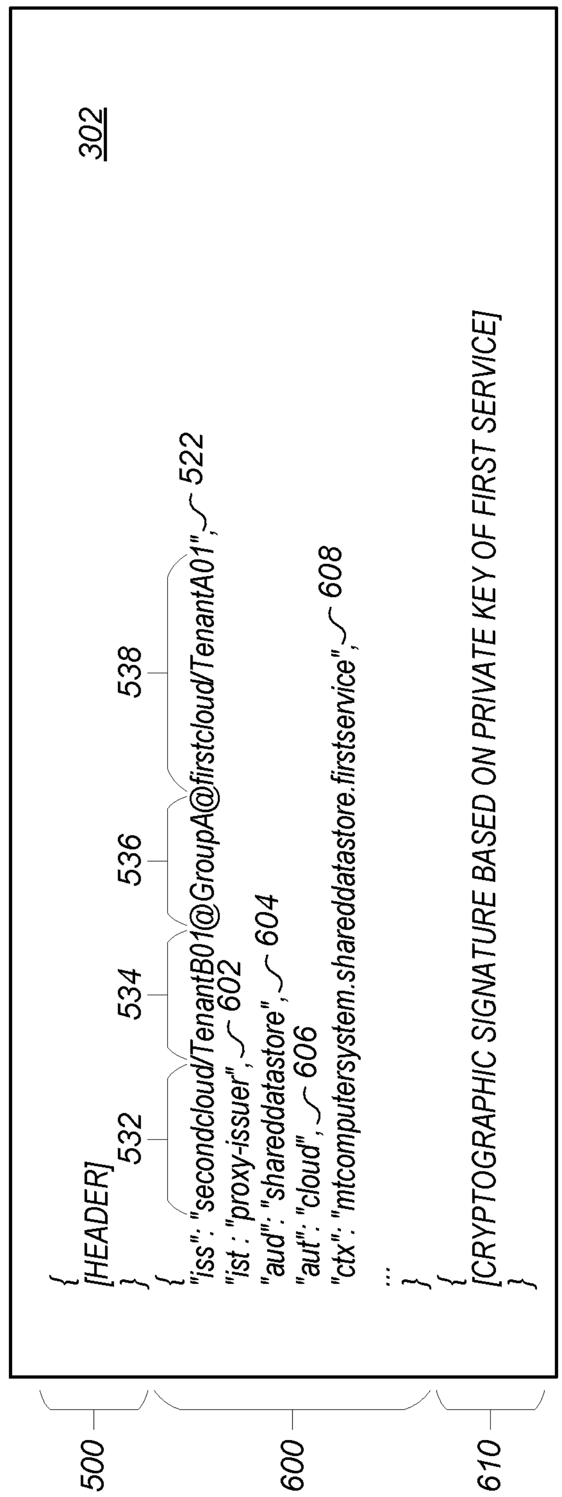
FIG. 6 is an example token sent from a shared service to a shared datastore in accordance with various embodiments.

In the embodiment shown in FIG. 3, first shared service 124A receives a request from first multi-tenant cloud computing service 122A sent on behalf of tenant A01202. Subsequent to receiving a request, shared services 124 (e.g., first shared service 124A as shown in FIG. 3) are operable to authenticate the request using cloud-to-cloud interface service 140 and tenant group module 150 and information in first token 300. After authenticating the request, in various embodiments, the shared services 124 (e.g., first shared service 124A as shown in FIG. 3) are operable to "wrap" first token 300 in a second token 302, and send the second token 302 to shared datastore 130 as part of accessing shared datastore 130 to execute the request. In such embodiments, second token 302 contains information that can be verified to ensure that the request is indeed from a particular shared service 124, as well as the contents of first token 300, which identifies the tenant and tenant group. For example, in embodiments in which first token 300 is a JWT, second token 302 may be implemented as a chain of two JWTs (in which one of the JWTs in the chain is a copy of first token 300). Shared datastore 130 is operable to authenticate the access using cloud-to-cloud interface service 140 and tenant group module 150 and information in in second token 302. An example second token 302 is shown in FIG. 6.

Cloud-to-cloud interface service 140 includes a cryptographic module 310 that is operable to perform the various cryptographic operations discussed herein. In various embodiments, cloud-to-cloud interface service 140 stores (or has access to) public keys for the various tenants of the multi-tenant computer services 122. In various embodiments, the various multi-tenant computer services 122 generates respective private and public key pairs for their respective tenants. Then, the various multi-tenant computer services 122 send copies of the public keys to cloud-to-cloud interface service 140. Then, when a shared service 124 receives a first token 300 claiming to be from a particular tenant of a particular multi-tenant computer service 122, the shared service 124 is operable to authenticate first token 300 with cloud-to-cloud interface service 140. For example, cryptographic module 310 is operable to authenticate a portion of first token 300 that is a cryptographic indicator of tenant A01 202. As discussed below, a portion of first token 300 (e.g., a signature section 520 shown in FIG. 5) is cryptographically signed using a private key corresponding to tenant A01 202 or a signature generated using the private key and other portions of first token 300. In various embodiments, cloud-to-cloud interface service 140 has a copy of the public key used by tenant A01 202. If cloud-to-cloud interface service 140 is able to validate a cryptographic signature in first token 300 with the copy of the public key on record for tenant A01 202, then first token 300 can be authenticated. In various embodiments, cloud-to-cloud interface service 140 also includes a tenant group identifier module 312 that is operable to generate the tenant grouping indicators 320 (e.g., tenant grouping indicator 320A, tenant grouping indicator 320B) discussed herein (e.g., the UUID and/or natural key for tenant group A 200).

As discussed herein, tenant grouping module 150 is operable to authenticate requests by determining whether a requesting tenant is a member of the tenant group that is invoked in the request. In various embodiments, tenant grouping module 150 includes (or has access to) records of tenant grouping indicators 320 and tenant lists 322 for the various tenant groups. For example, tenant group module 150 includes tenant grouping indicators 320A for tenant group A 200 (e.g., the UUID and/or natural key for tenant group A 200) and tenant grouping indicators 320B for tenant group B 210 (e.g., the UUID and/or natural key for tenant group B 200). Additionally, tenant group module 150 includes tenant lists 322 for the various tenant groups such as tenant list 322A for tenant group A 200 and tenant list 322B for tenant group B 210. As discussed herein, tenant lists 322 may include any of a number of indicators that identity the various tenants that are members of a tenant group (e.g., public keys of the tenants, UUIDs of the tenants). In various embodiments, to authenticate a request, shared services 124 and shared datastore 130 are operable to verify that a tenant is a member of the claimed tenant group by using tenant group module 150 to look up the claimed tenant group using a tenant grouping indicator included in the request (e.g., using a UUID corresponding to tenant group A 200 included in first token 300) and determine whether the tenant on whose behalf the request was sent appears on the tenant list 322 (e.g., determining that an identifier of tenant A01 202 is included on tenant list 322A).

Prior to using a tenant group to authenticate a request, the tenant group is provisioned by multi-tenant computer system 120 and one or more tenants are added to the tenant group. In various embodiments, a tenant of a multi-tenant cloud computing service 122 (e.g., tenant A01 202) can request that tenant group capability be enabled and cause a provisioning request to be sent from the multi-tenant cloud computing service 122 (e.g., to tenant group module 150, to cloud-to-cloud interface service 140). In response, a tenant group is created and one or more tenant group indicators are assigned (e.g., cloud-to-cloud interface service 140 assigned a UUID to the newly provisioned tenant group) and tenant group indicators are stored (e.g., a UUID and natural key corresponding to tenant group A 200 is stored). In various embodiments, one or more tenants are identified as the owning tenant (e.g., the tenant that requested that the tenant group be created). After a tenant group has been created, one or more tenants may be added to the tenant group using subsequent provisioning requests. In various embodiments, these subsequent provisioning requests may be sent via the multi-tenant cloud computing service 122 of the owning tenant (e.g., because tenant A01 202 is the primary member for tenant group A 200, subsequent provisioning requests may be sent via first multi-tenant cloud computer service 122A). In various embodiments, subsequent provisioning requests are similar to first token 300 in that subsequent provisioning requests are signed using a private key of the owning tenant and include a tenant grouping indicator. The subsequent provisioning requests also include a payload with identifiers of the additional tenants to add to the tenant group. In various embodiments, only the owning tenant can request that additional tenants of the plurality of multi-tenant cloud computing services 122A be added to the tenant group as members.

Figure 4:
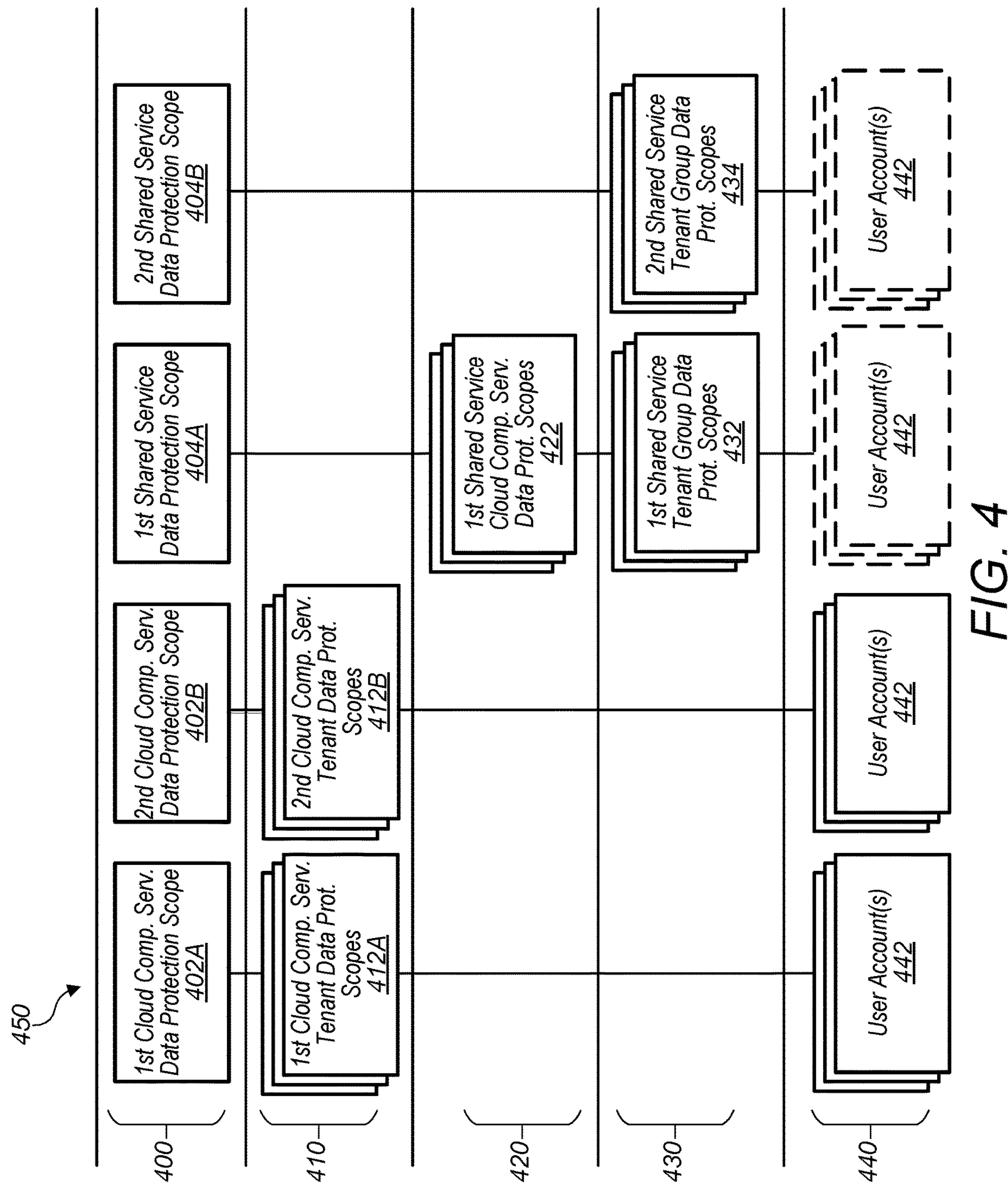
FIG. 4 is block diagram of a data protection scope hierarchy useable to determining whether requests are authorized in accordance with various embodiments.

In various embodiments, the various components of multi-tenant computer system 120 use a hierarchy of data protections scopes to determine whether requests are authorized. For example, a multi-tenant cloud computing service 122 may be operable to use data protection scopes to determine whether a particular tenant is authorized to send a request to a shared service. Similarly, shared services 124 may be operable to use data protection scopes to determine whether a particular tenant is authorized to send request to a particular shared service 124 and to determine whether a particular tenant is authorized to access shared datastore 130 in the context of the particular shared service 124. FIG. 4 is block diagram of a data protection scope hierarchy 450 useable to determine whether requests are authorized in accordance with various embodiments. In various embodiments, data protection scope hierarchy 450 includes a plurality of levels (e.g., levels 400, 410, 420, 430, 440) each of which includes one or more data protection scopes (e.g., data protection scopes 402 and 404 at level 400, data protections scopes 412 at level 410). As discussed herein, multi-tenant computer system 120 uses data protection scope hierarchy 450 to secure access to information (e.g., directories in shared datastore 130) such that when a remote computer system 110 attempts to access secured information, multi-tenant computer system 120 consults data protection scope hierarchy 450 to determine whether to grant the access attempt. Data protection scope hierarchies are discussed in additional detail in U.S. patent application Ser. No. 16/588,550 entitled "Nested Tenancy That Permits A Hierarchy Having A Plurality Of Levels."

In various embodiments, hierarchy 450 includes a plurality of levels. In the embodiment represented in FIG. 4, there are five levels: 400, 410, 420, 430, and 440, although in various other embodiments there may be any of a number of levels numbering two or greater. In the embodiment shown in FIG. 4, level 400 is the top-level of the hierarchy 450 with levels beneath being subordinate to level 400. For example, levels 410 and 420 include data protection scopes 412 and 422 that are directly subordinate to data protection scopes 402 and 404, respectively. Thus, in various embodiments, levels 410 and 420 are subordinate to level 400, level 430 is subordinate to level 420 (and in turn level 410), and level 440 is subordinate to levels 400, 410, 420, and 430.

In data protection scope hierarchy 450, subordinate data protection scopes (e.g., 412, 422, 424) have access equal to or less than their superior data protection scopes (e.g., 402, 404) in various embodiments. In such embodiments, therefore, a tenant of a particular multi-tenant cloud computing service 122 would have access only to a subset of the information to which the particular multi-tenant computing service 122 has access. In various embodiments, data protection scopes at the same level are also isolated from each other such that at least some of the information accessible with a first data protection scope (e.g., First Cloud Computing Service Data Protection Scope 402A) is isolated from at least some of the information accessible with a second data protection scope (e.g., Second Cloud Computing Service Data Protection Scope 402B). In various embodiments, though, information is accessible by multiple data protection scopes. In some embodiments, such information that is made available to all data protection scopes at the same level of hierarchy 450, or all data protection scopes of the same type (e.g., all cloud computing service data protection scope 402). As discussed herein, an entity may use a tenant group to establish a trust relationship between various tenants it owns. In such instances, the data protection scopes corresponding to the grouped tenants may likewise be equalized. In various embodiments, for example, all members of a tenant group may be assigned to the data protection scope corresponding to the primary member of the tenant group.

Level 400 is the top-most level of hierarchy 450. Cloud computing service data protection scopes 402 and shared service data protection scopes 404 in the embodiment shown in FIG. 4. In various embodiments, data protection scopes in level 400 are associated with first-class tenants of multi-tenant computer system. As discussed herein, levels in hierarchy 450 subordinate to level 400 are associated with subtenants of these first-class tenants or user accounts used to access tenants or subtenants.

Cloud computing service data protection scope 402 are associated with multi-tenant cloud computing service 122 that have their own subtenants. In various embodiments in which multi-tenant computer system 120 is operated by SALESFORCE, examples of multi-tenant cloud computing service include a Customer Relationship Management (CRM) system that manages data for sales management for its subtenants, a Commerce Cloud that provides a unified commerce platform across multiple channels for subtenants, and a Marketing Cloud that provides digital marketing automation and analytics software and services for subtenants. As shown in FIG. 4, two cloud computing service data protection scope 402 are provisioned in hierarchy 450: First Cloud Computing Service Data Protection Scope 402A, which has a first set of subtenants, and Second Cloud Computing Service Data Protection Scope 402B, which has a second set of subtenants. While cloud computing service data protection scope 402 are shown in FIG. 4, any number may be present in hierarchy 450.

Shared service data protection scopes 404 are associated with service products. As used herein, a shared service (a) "operates in the context of a multi-tenant cloud computing service 122" when it is acting on behalf of a particular multi-tenant cloud computing service 122 and (b) "operates in the context of a tenant of a multi-tenant cloud computing service 122" when it is acting on behalf of a particular tenant of a particular multi-tenant cloud computing service 122. In various embodiments in which multi-tenant computer system 120 is operated by SALESFORCE, examples of shared services include an Inventory Service that is operable to manage an inventory of items (e.g., with holds on certain items, real-time availability, metrics) or an Asset Optimizer Service that is operable to manage metadata about digital assets for the tenant's commerce store. As shown in FIG. 4, two shared service data protection scopes 404 are provisioned in hierarchy 450: First Shared Service Data Protection Scope 404A and Second Shared Service Data Protection Scope 404B. As discussed below, subordinate data protection scopes are provisioned for shared service operating in the context of a multi-tenant cloud computing service 122 (e.g., First Shared Service Cloud Computing Service Data Protection Scopes 422) or in the context of tenants of cloud products (e.g., first shared service cloud computing service tenant data protection scopes 432). While two shared service data protection scopes 404 are shown in FIG. 4, any number may be present in hierarchy 450.

Level 410 includes cloud computing service tenant data protection scopes 412 that are subordinate to cloud computing service data protection scopes 402 in level 400. As shown in FIG. 4, hierarchy 450 includes a plurality of First Cloud Computing Service Tenant Data Protection Scopes 412A that are subordinate to First Cloud Computing Service Data Protection Scope 402A and a plurality of Second Cloud Computing Service Tenant Data Protection Scopes 412B that are subordinate to Second Cloud Computing Service Data Protection Scopes 402B.

Level 420 includes data protection scopes for shared services operating in the context of multi-tenant cloud computing services 122: shared service cloud computing service data protection scopes 422. These shared service cloud computing service data protection scopes 422 are subordinate to the data protection scopes for their respective service products, but these shared service cloud computing service data protection scopes 422 are also limited by the data scopes for their respective multi-tenant cloud computing services 122. Thus, First Shared Service Cloud Computing Service Data Protection Scopes 422 are subordinate to First Shared Service Data Protection Scope 404A, but because each of the First Shared Service Cloud Computing Service Data Protection Scopes 422 are operating in the context of different multi-tenant cloud computing services 122, these scopes are also limited by the respective cloud computing service data protection scopes 402 (e.g., if first shared service 124A is operating in the context of first multi-tenant cloud computing service 122A, then the First Shared Service Cloud Computing Service Data Protection Scopes 422 is limited by First Cloud Computing Service Data Protection Scope 402A).

Level 430 includes data protection scopes for shared services operating in the context of tenants of multi-tenant cloud computing services 122: shared service cloud computing service tenant data protection scopes 432 and shared service cloud computing service tenant data protection scopes 434. These shared service cloud computing service tenant data protection scopes 432 are subordinate to the data protection scopes for their respective shared service products operating in the context of multi-tenant cloud computing services 122, but these shared service cloud computing service data protection scopes 422 are also limited by (a) the data scopes for their respective multi-tenant cloud computing services 122 and (b) the data protection scopes for their respective tenants of those multi-tenant cloud computing services 122. In some embodiments, shared service cloud computing service tenant data protection scopes 434 may be provisioned subordinate to shared service data protection scopes 404 (e.g., with no shared service cloud computing service data protection scopes).

Level 440 includes user accounts 442 used by end users to access the data protection scopes in hierarchy 450. In various embodiments, user accounts 442 associated with the same data protection scope have different levels of access to the information protected using hierarchy 450. For example, a first user account 442 is associated with a salesman and a second user account 442 is associated with a sales manager who manages the salesman and other salesmen. In such embodiments, the second user account 442 has access to more of the protected data than the first user account 442.

However, user accounts 442 do not have access to more information than their respective data protection scopes, in various embodiments. In some embodiments, however, a single user account 442 may be associated with multiple data protection scopes, and may therefore have access to information beyond the scope of a single data protection scope. In some embodiments, user accounts 442 are only provisioned under cloud computing service data protection scopes 402, but in other embodiments may optionally (as shown in the dashed lines) be provisioned under shared service data protection scopes 404 (e.g., in instances in which a user accounts may be used to access shared services 124 without using a multi-tenant cloud computing service).

FIG. 5 is an example first token 300 sent from a multi-tenant cloud computing service 122 to a shared service 124 (e.g., a first token 300 sent from second multi-tenant cloud computing service 122B to first shared service 124A) in accordance with various embodiments. In the embodiment shown in FIG. 5, first token 300 is formatted as a JWT with a header section 500, a payload section 510, and a signature section 520. In various instances, the header section 500 identifies first token 300 as a JWT and indicates the algorithm that was used to generate the signature section 520. Any suitable cryptographic algorithm may be used including but not limited to HMAC with SHA-256 or RSA signature with SHA-256. The signature section 520 is usable to validate first token 300. In various embodiments, signature section 520 is generated by encoding the contents of header section 500 and payload section 510 (e.g., by encoding the contents of header section 500 and payload section 510 using a binary-to-text encoding schema and concatenating the results), and then running the encoded results through the cryptographic algorithm identified in header section 500 and using a private key of the issuer of first token 300 (in this case, tenant B01 204).

Payload section 510 includes an issuer ("iss") entry 522 that identifies the principal that issued the JWT, an issuer type ("ist") entry 524 that identifies the tenant group scope and instructs the recipient to treat first token 300 according to the tenant group authentication techniques discussed herein, an audience ("aud") entry 526 that identifies the particular shared service 124 (i.e., first shared service 124A) to which first token 300 is addressed, an audience type ("aut") entry 528 that identifies the request to shared service 124 to be a request to a shared service, and a context ("ctx") entry 530 that provides context for the request that is useable to ensure logical isolation (e.g., the context for the request is the second multi-tenant cloud computing service 122B in the context of the multi-tenant computer system 120). In the embodiment shown in FIG. 5, iss entry 522 includes an identifier 532 of the multi-tenant cloud computing service 122 from which the request was sent (i.e., second multi-tenant cloud computing service 122B), an identifier 534 of the tenant of the multi-tenant cloud computing service 122 on whose behalf the request was sent (i.e., tenant B01 204), and an identifier 536 of the tenant group (i.e., a tenant grouping indication 320A of tenant group A 200). In various embodiments, iss entry 522 also includes an indicator 538 of the primary member of the tenant group and an indicator of which multi-tenant cloud computing service 122 that primary member is a tenant (i.e., tenant A01 202 of first multi-tenant cloud computing service 122A).

As discussed herein, a recipient of first token 300 is operable to authenticate the request for which first token 300 was sent (e.g., by authenticating the signature section 520) and by verifying that the tenant identified in the iss entry 522 is a member of the tenant group identified in the iss entry 522. Thus, in the example shown in FIG. 5, first shared service 124A is able to authenticate the request by cryptographically authenticating signature section 520 with cloud-to-cloud interface service 140 and verifying membership of tenant B01 204 in tenant group A 200 with tenant group module 150.

FIG. 6 is an example second token 302 sent from a shared service 124 to a shared datastore 130 (e.g., a second token 302 sent from first shared service 124A to shared datastore 130 as shown in FIG. 3) in accordance with various embodiments. In the embodiment shown in FIG. 6 (and similar to first token 300 shown in FIG. 5), second token 302 is formatted as a JWT with a header section 500, a payload section 600, and a signature section 610. In various instances, the header section 500 identifies first token 300 as a JWT and indicates the algorithm that was used to generate the signature section 520. Any suitable cryptographic algorithm may be used including but not limited to HMAC with SHA-256 or RSA signature with SHA-256. The signature section 610 is usable to validate second token 302. In various embodiments, signature section 610 is generated by encoding the contents of header section 500 and payload section 600 (e.g., by encoding the contents of header section 500 and payload section 600 using a binary-to-text encoding schema and concatenating the results), and then running the encoded results through the cryptographic algorithm identified in header section 500 and using a private key shared service 124 (in this case, first shared service 124A).

Similar to payload section 510 of first token 300, payload section 600 includes an issuer iss entry 522 that identifies the principal that issued the JWT. As shown in FIGS. 5 and 6, the iss entry 522 is the same for both first token 300 and second token 302. In the embodiment shown in FIG. 6, iss entry 522 includes an identifier 532 of the multi-tenant cloud computing service 122 from which the request was sent (i.e., second multi-tenant cloud computing service 122B), an identifier 534 of the tenant of the multi-tenant cloud computing service 122 on whose behalf the request was sent (i.e., tenant B01204), and an identifier 536 of the tenant group (i.e., a tenant grouping indication 320A of tenant group A 200). In various embodiments, iss entry 522 also includes an indicator 538 of the primary member of the tenant group and an indicator of which multi-tenant cloud computing service 122 that primary member is a tenant (i.e., tenant A01 202 of first multi-tenant cloud computing service 122A). Payload section 600 also includes an ist entry 602 that identifies the second token 302 as a proxy token (e.g., a token that is has been wrapped around another token another token from another issuer), an and entry 604 that identifies shared datastore 130 to which second token 302 is addressed, an aut entry 606 that identifies the request to shared datastore 130 to be targeted at the shared datastore 130 rather than any particular tenant of shared datastore 130, and a ctx entry 608 that provides context for the request that is useable to ensure logical isolation (e.g., the context for the request is the shared datastore 130 in the context of first shared service 124A in the context of the multi-tenant computer system 120).

As discussed herein, a recipient of second token 302 (e.g., shared datastore 130) is operable to authenticate the request for which second token 302 was sent (e.g., by authenticating the signature section 610) and by verifying that the tenant identified in the iss entry 522 is a member of the tenant group identified in the iss entry 522. Thus, in the example shown in FIG. 6, shared datastore 130 is able to authenticate the request by cryptographically authenticating signature section 610 with cloud-to-cloud interface service 140 and verifying membership of tenant B01 204 in tenant group A 200 with tenant group module 150.

Figure 7:
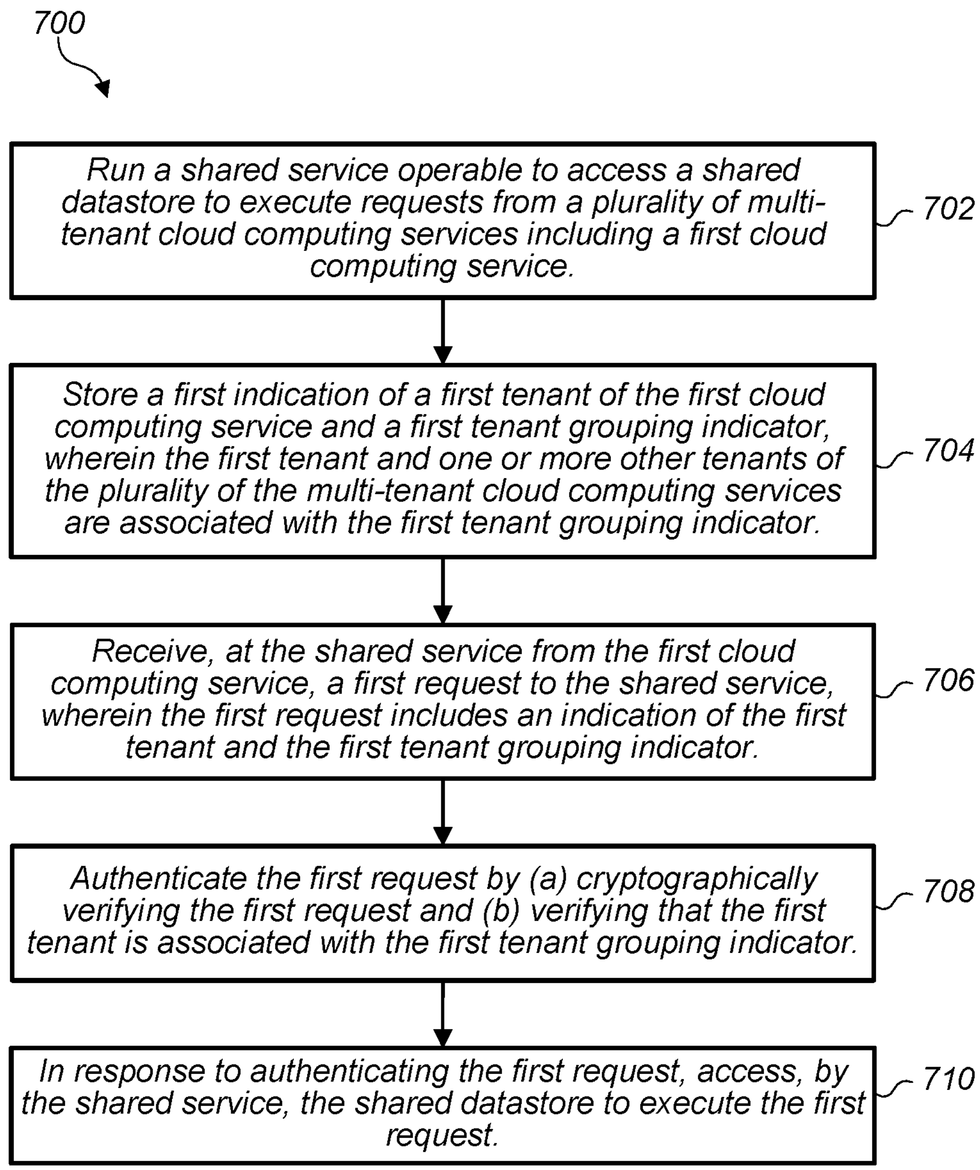
FIG. 7 is flowchart illustrating an embodiment of an authentication and execution method in accordance with the various embodiments.

Referring now to FIG. 7, a flowchart depicting an authentication and execution method 700 is depicted. In the embodiment shown in FIG. 7, the various actions associated with method 700 are implemented by multi-tenant computer system 120. At block 702, multi-tenant computer system 120 runs a shared service 124 (e.g., first shared service 124A) operable to access a shared datastore 130 to execute requests from a plurality of multi-tenant cloud computing services 122 including a first multi-tenant cloud computing service 122A. At block 704, multi-tenant computer system 120 stores a first indication of a first tenant (e.g., tenant A01 202) of the first multi-tenant cloud computing service 122A and a first tenant grouping indicator (e.g., a tenant grouping indicator 320A for tenant group A 200), wherein the first tenant and one or more other tenants of the plurality of the multi-tenant cloud computing services 122 are associated with the first tenant grouping indicator. At block 706, multi-tenant computer system 120 receives at the shared service 124 running on multi-tenant computer system 120, from the first multi-tenant cloud computing service 122A, a first request to the shared service 124. The first request includes an indication of the first tenant and the first tenant grouping indicator. At block 708, shared service 124 of the multi-tenant computer system 120 authenticates the first request by (a) cryptographically verifying the first request and (b) verifying that the first tenant is associated with the first tenant grouping indicator. At block 710, in response to authenticating the first request, accessing, by the shared service running on multi-tenant computer system 120, the shared datastore 130 to execute the first request.

Exemplary Computer System

Figure 8:
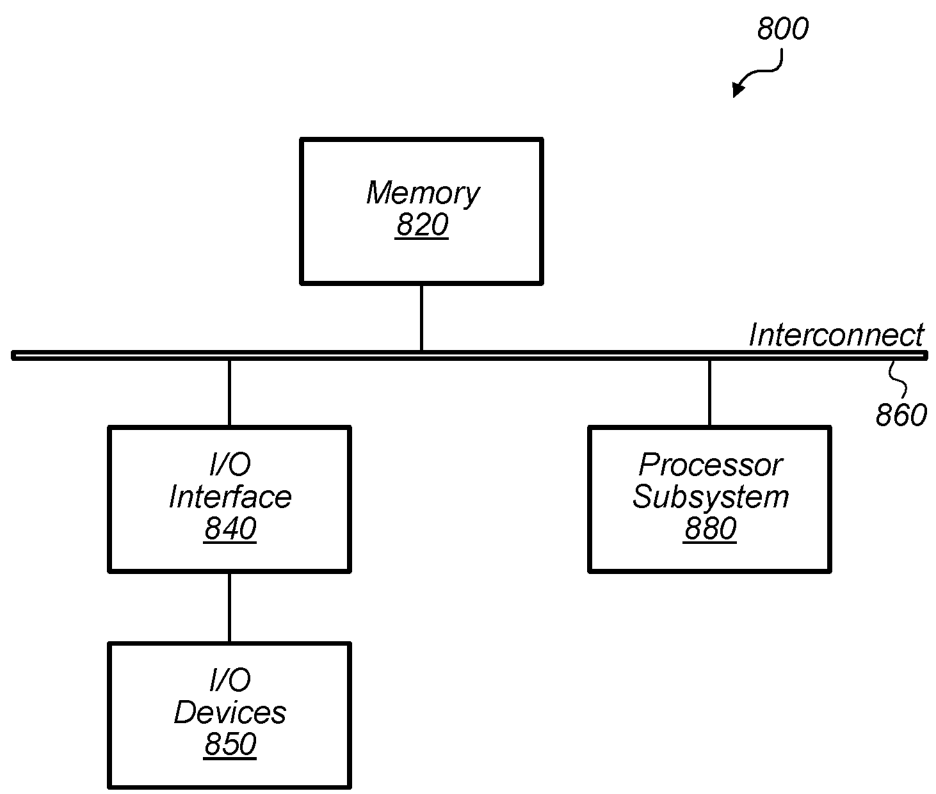
FIG. 8 is a block diagram of an exemplary computer system, which may implement the various components of FIGS. 1, 2, and 3.

Turning now to FIG. 8, a block diagram of an exemplary computer system 800, which may implement the various components of computer system 100 (e.g., multi-tenant computer system 120) is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable to store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device (e.g., configured to communicate over WiFi, Bluetooth, Ethernet, etc.), another example of an I/O device 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of authenticating accesses to a shared datastore, the method comprising:

running, at a computer system, a shared service operable to access the shared datastore to execute requests from a plurality of multi-tenant cloud computing services including a first multi-tenant cloud computing service;

storing, at the computer system, a tenant grouping indicator that is indicative of a grouping of a first tenant of the first multi-tenant cloud computing service with one or more tenants of other ones of the plurality of multi-tenant cloud computing services that are permitted to access a set of resources managed by the shared service, wherein the first tenant is the only tenant associated with the tenant grouping indicator that is allowed to request that additional tenants of the plurality of multi-tenant cloud computing services be associated with the tenant grouping indicator;

receiving, at the computer system from the first multi-tenant cloud computing service, a first request to the shared service, wherein the first request includes a first token that includes a first indication of the first tenant and the tenant grouping indicator;

in response to verifying that the first tenant is associated with the tenant grouping indicator, accessing, by the shared service, the shared datastore to execute the first request, wherein the accessing includes sending, to the shared datastore, a second token that includes an indication of the shared service and the first token; and wherein the second token is usable by the shared datastore to authenticate the first request, authenticate the accessing by the shared service, and verify that the first tenant is associated with the tenant grouping indicator.

2. The method of claim 1, wherein the first token includes an indication of a primary tenant associated with the tenant grouping indicator and an indication of the shared service, and wherein the second token includes an indication that the second token is a proxy token and targets the shared datastore.

3. The method of claim 1, further comprising:

determining, by the computer system, that the first request is authorized using a hierarchy of data protection scopes that includes a shared service tenant group data protection scope that corresponds to the tenant grouping indicator.

4. The method of claim 1, further comprising:

storing, at the computer system, a second indication of a second tenant of a second multi-tenant cloud computing service of the plurality of multi-tenant cloud computing services, wherein the second tenant is associated with the tenant grouping indicator; and based on authenticating a second request from the second multi-tenant cloud computing service, accessing, by the shared service running on the computer system, the shared datastore to execute the second request;

wherein the first tenant and the second tenant correspond to the same entity; and wherein the accessing of the shared datastore to execute the first request includes writing a value to the shared datastore and the accessing of the shared datastore to execute the second request includes reading the value from the shared datastore.

5. The method of claim 1, further comprising:

storing, at the computer system, a second indication of a second tenant of a second multi-tenant cloud computing service of the plurality of multi-tenant cloud computing services, wherein the second tenant is associated with the tenant grouping indicator; and wherein tenancy in the first multi-tenant cloud computing service is defined by a first set of parameters and tenancy in the second multi-tenant cloud computing service is defined by a second set of parameters.

6. The method of claim 1, wherein the accessing of the shared datastore to execute the first request includes accessing a particular directory of the shared datastore corresponding to the shared service and the tenant group indicator and updating a value stored in the particular directory, wherein the particular directory is logically isolated from other directories corresponding to other tenant group indicators.

7. The method of claim 1, further comprising:

running, at the computer system, a second shared service operable to:

access the shared datastore to execute requests from the plurality of multi-tenant cloud computing services; and authenticate requests made to the second shared service from the plurality of multi-tenant cloud computing systems using the tenant grouping indicator;

wherein tenant grouping is the only representation of trust relationships between tenants of the plurality of multi-tenant cloud computing services used by the shared service and the second shared service to authenticate requests.

8. A non-transitory computer-readable storage medium storing program instructions that are capable of being executed by a computer system to perform operations comprising:

running a shared service operable to access a shared datastore to execute requests from a plurality of multi-tenant cloud computing services including a first multi-tenant cloud computing service;

storing a tenant grouping indicator that is indicative of a grouping of a first tenant of the first multi-tenant cloud computing service with one or more tenants of other ones of the plurality of multi-tenant cloud computing services that are permitted to access a set of resources managed by the shared service;

receiving, from the first multi-tenant cloud computing service, a first request to the shared service, wherein the first request includes a first token that includes an indication of the first tenant and the tenant grouping indicator;

determining that the first request is authorized using a hierarchy of data protection scopes that includes a shared service tenant group data protection scope that corresponds to the tenant grouping indicator;

in response to verifying that the first tenant is associated with the tenant grouping indicator, accessing the shared datastore to execute the first request, wherein the accessing includes sending, to the shared datastore, a second token that includes an indication of the shared service and the first token; and wherein the second token is usable by the shared datastore to authenticate the first request, authenticate the accessing by the shared service, and verify that the first tenant is associated with the tenant grouping indicator.

9. The non-transitory computer-readable storage medium of claim 8, wherein the first token includes an indication of a primary tenant associated with the tenant grouping indicator and an indication of the shared service, and wherein the second token includes an indication that the second token is a proxy token and targets the shared datastore.

10. The non-transitory computer-readable storage medium of claim 8, wherein the first tenant is the only tenant associated with the tenant grouping indicator that is allowed to request that additional tenants of the plurality of multi-tenant cloud computing services be associated with the tenant grouping indicator.

11. The non-transitory computer-readable storage medium of claim 8, wherein the operations further comprise:

storing a second indication of a second tenant of a second multi-tenant cloud computing service of the plurality of multi-tenant cloud computing services, wherein the second tenant is associated with the tenant grouping indicator; and based on authenticating a second request from the second multi-tenant cloud computing service, accessing the shared datastore to execute the second request;

wherein the first tenant and the second tenant correspond to the same entity; and wherein the accessing of the shared datastore to execute the first request includes writing a value to the shared datastore and the accessing of the shared datastore to execute the second request includes reading the value from the shared datastore.

12. The non-transitory computer-readable storage medium of claim 8, wherein the operations further comprise:

storing a second indication of a second tenant of a second multi-tenant cloud computing service of the plurality of multi-tenant cloud computing services, wherein the second tenant is associated with the tenant grouping indicator; and wherein tenancy in the first multi-tenant cloud computing service is defined by a first set of parameters and tenancy in the second multi-tenant cloud computing service is defined by second set of parameters.

13. The non-transitory computer-readable storage medium of claim 8, wherein the operations further comprise:

running a second shared service operable to access the shared datastore to execute requests from the plurality of multi-tenant cloud computing services, wherein the second shared service is operable to authenticate requests made to the second shared service from the plurality of multi-tenant cloud computing services using the tenant grouping indicator;

wherein tenant grouping is the only representation of trust relationships between tenants of the plurality of multi-tenant cloud computing services used by the shared service and the second shared service to authenticate requests.

14. A system, comprising:

at least one processor; and memory having program instructions stored thereon that are executable by the at least one processor to perform operations comprising:

running a shared service operable to access a shared datastore to execute requests from a plurality of multi-tenant cloud computing services including a first multi-tenant cloud computing service;

storing a tenant grouping indicator that is indicative of a grouping of a first tenant of the first multi-tenant cloud computing service with one or more tenants of other ones of the plurality of multi-tenant cloud computing services that are permitted to access a set of resources managed by the shared service;

receiving, from the first multi-tenant cloud computing service, a first request to the shared service, wherein the first request includes a first token that includes an indication of the first tenant and the tenant grouping indicator;

in response to verifying that the first tenant is associated with the tenant grouping indicator, accessing the shared datastore to execute the first request, wherein the accessing includes sending, to the shared datastore, a second token that includes an indication of the shared service and the first token; and wherein the second token is usable by the shared datastore to authenticate the first request, authenticate the accessing by the shared service, and verify that the first tenant is associated with the tenant grouping indicator, and wherein the accessing of the shared datastore to execute the first request includes accessing a particular directory of the shared datastore corresponding to the shared service and the tenant group indicator and updating a value stored in the particular directory, wherein the particular directory is logically isolated from other directories corresponding to other tenant group indicators.

15. The system of claim 14, wherein the operations further comprise:

running a second shared service operable to access the shared datastore to execute requests from the plurality of multi-tenant cloud computing services, wherein the second shared service is operable to authenticate requests made to the second shared service from the plurality of multi-tenant cloud computing services using the tenant grouping indicator;

wherein tenant grouping is the only representation of trust relationships between tenants of the plurality of multi-tenant cloud computing services used by the shared service and the second shared service to authenticate requests.

16. The system of claim 14, wherein the first tenant is the only tenant associated with the tenant grouping indicator that is allowed to request that additional tenants of the plurality of multi-tenant cloud computing services be associated with the tenant grouping indicator.

17. The system of claim 14, wherein the operations further comprise:

determining, using a hierarchy of data protection scopes including a shared service tenant group data protection scope that corresponds to the tenant grouping indicator, that the first request is authorized.

* * * * *